No. 698,577. Patented Apr. 29, 1902.
E. B. STEARNS.
HORSE DETACHER.
(Application filed Apr. 13, 1901.)
(No Model.)
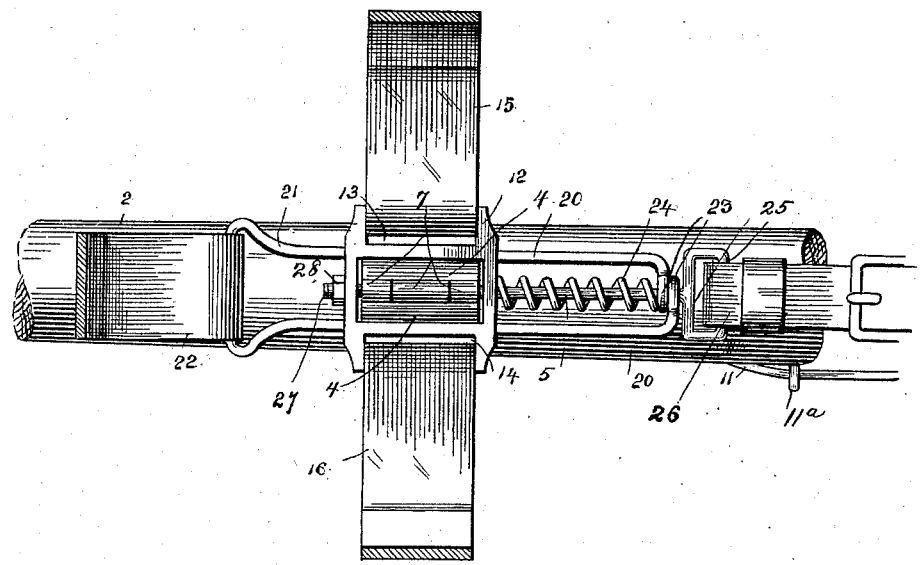
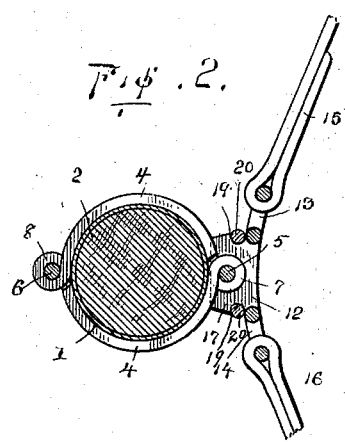
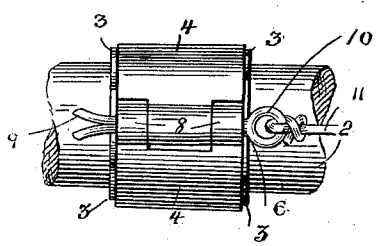
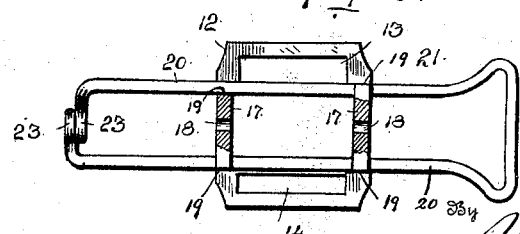
Inventor
E. B. Stearns
Witnesses
By Victor J. Evans
Attorney

UNITED STATES PATENT OFFICE.

EDMOND B. STEARNS, OF ELDORADO, KANSAS.

HORSE-DETACHER.

SPECIFICATION forming part of Letters Patent No. 698,577, dated April 29, 1902.

Application filed April 13, 1901. Serial No. 55,756. (No model.)

*To all whom it may concern:*

Be it known that I, EDMOND B. STEARNS, a citizen of the United States, residing at Eldorado, in the county of Butler and State of Kansas, have invented new and useful Improvements in Horse-Detachers, of which the following is a specification.

This invention relates to horse-detachers, the object being to provide simple and easily-operated means whereby a horse may be quickly detached from the thills and vehicle for the purpose of preventing serious accident to the occupants of a vehicle in case the horse runs away or becomes unmanageable.

With the above general object in view the invention consists in the novel construction, combination, and arrangement hereinafter fully described, illustrated, and claimed.

In the accompanying drawings, Figure 1 is a side elevation of the horse-detaching device shown applied to a thill and looking toward the inside of the thill. Fig. 2 is a vertical transverse section through the same. Fig. 3 is a detail elevation of the hitch-plate and slide-loop. Fig. 4 is a detail elevation of a portion of a thill, showing the flanged collar thereon.

Similar numerals of reference designate corresponding parts in all figures of the drawings.

The horse-detaching device contemplated in this invention is adapted to be applied to any harness and is in the nature of an attachment.

In carrying out the invention I provide a pair of flanged collars or ferrules 1, one for each thill, which are placed around the thills or shaft members 2 and fixedly secured thereon in any convenient manner. Each of said collars is provided at its opposite ends with the peripheral flanges 3, between which is received a sleeve 4, the said sleeve encircling the collar 1 and being prevented from moving longitudinally on the thill by means of the retaining-flanges 3. Each of the sleeves 4 comprises a pair of semicircular sections, which are hinged together at their inner side by means of a hinge-pin 5 and provided at their outer sides with a keeper-pin 6, which normally holds the sleeve-sections together and in engagement with the collar 1, as shown in Fig. 2.

7 and 8 are the interfitting knuckles for the hinge-pin 5 and keeper-pin 6, respectively. Said pin 6 is split in the form of a cotter-pin, as shown at 9, to provide spring terminal portions which serve to hold the pin in place in the knuckles 8 and prevent its accidental escape. The pin 6 is further provided at its opposite end with an eye 10, to which is connected a controlling-cord 11, passed through an eye 11$^a$ on the thill and adapted to extend backward within reach of the driver, who may operate the cord for withdrawing the pin 6 when it becomes necessary to detach the animal from the vehicle.

Associated with the sleeve 4 is what I term a "hitch-plate" 12, provided at top and bottom with loops 13 and 14 for the reception of the back-band 15 and girth-strap 16, as illustrated in the drawings. The hitch-plate is further provided with the oppositely-located parallel ears 17, having openings 18 for the reception of the pin 5, which thereby connects the hitch-plate 12 to the sleeve 4. The ears 17 are provided with the oppositely-located notches 19 to slidingly receive the side bars 20 of a slide-loop 21, one end of which is expanded to receive the extended side portions 22 of the breast-strap of the harness. The terminal portions of the slide-loop 21 are provided with registering eyes 23 to receive the pin 5, and a cushioning-spring 24 is disposed around the pin 5 and interposed between the inner eye 23 and the adjacent ear 17 of the hitch-loop, said spring serving by its tension to draw the slide-loop backward and cushion the movements of the animal, thus absorbing the jar or jerk which would otherwise be imparted to the vehicle and to the neck of the animal.

The hinge-pin 5 is provided at its rear end with an eye 25, receiving the loop of a strap 26, and is secured at its screw-threaded front end 27 by a nut 28, bearing on the forward ear 17.

From the foregoing description it will be understood that I dispense with the usual tugs or traces and hitch the animal directly to the thills or shaft members, at which point are placed the springs 24, which give a free and easy action to the shoulders of the horse. Should the horse run away or become unmanageable, the occupant of the vehicle, by pulling on the connections 11, may easily withdraw the pins 6, which will disconnect the sleeves from the ferrules on the thills and release the animal.

I do not desire to be limited to the details of construction hereinabove set forth, but reserve the right to change, modify, or vary the construction within the scope of the appended claims.

Having thus fully described my invention, what I claim as new, and desire to secure by Letters Patent, is—

1. A horse-detacher comprising a sleeve formed in sections adapted to embrace a thill, a hitch-plate having means whereby it is connected to the harness, a hinge-pin connecting the inner sides of the sections together and to the hitch-plate, a keeper-pin connecting the outer sides of the sections together, and means for withdrawing the keeper-pin.

2. A horse-detacher comprising a sleeve formed in sections adapted to embrace a thill, a hitch-plate having means whereby it is connected to the harness and provided with parallel ears projecting toward the sleeve, a hinge-pin extending through the ears and connecting the inner sides of the sections together, a keeper-pin connecting the outer sides of the sections together, and means for withdrawing the keeper-pin.

3. A horse-detacher comprising a sleeve formed in sections adapted to embrace a thill, a hitch-plate formed with top and bottom loops for the reception of the back-band, and girth-strap respectively, and with parallel ears projecting toward the sleeve, a hinge-pin extending through the ears and connecting the inner sides of the sections together, a keeper-pin connecting the outer sides of the sections together, and means for withdrawing the keeper-pin.

4. A horse-detacher comprising a sleeve adapted to embrace a thill, a hitch-plate hinged to the sleeve, and having means whereby it is connected to the harness, and a spring-controlled loop adapted to slide on the hitch-plate, and adapted to be connected with the breast-strap.

5. A horse-detacher comprising a sleeve adapted to embrace a thill, a hitch-plate hinged to the sleeve, and provided with ears having notches, a slide-loop having its side bars in engagement with the notched ears, and adapted to be connected to the breast-strap, and a cushioning-spring interposed between one end of the slide-loop and the hitch-plate.

6. A horse-detacher comprising a sleeve adapted to embrace a thill, a hitch-plate having means whereby it is connected to the harness, a slide-loop having eyes and mounted on the hitch-plate and having means whereby it is connected with the breast-strap, a hinge-pin passed through the eyes of the slide-loop and connecting the hitch-plate with the sleeve, a cushioning-spring encircling the hinge-pin and interposed between the eyes and the hitch-plate and a detachable keeper-pin.

In testimony whereof I affix my signature in presence of two witnesses.

EDMOND B. STEARNS.

Witnesses:
W. M. REES,
V. P. MOONEY.